United States Patent [19]

Scaduto

[11] Patent Number: 4,854,603
[45] Date of Patent: Aug. 8, 1989

[54] CONSTANT CAMBER SUSPENSION SYSTEM

[76] Inventor: Onofrio Scaduto, 1623 S. 56th Ct., Cicero, Ill. 60650

[21] Appl. No.: 212,218

[22] Filed: Jun. 24, 1988

[51] Int. Cl.⁴ ............................................. B62D 9/02
[52] U.S. Cl. .................................. 280/112.1; 280/675; 280/689; 280/772; 280/661
[58] Field of Search ............... 280/679, 772, 675, 676, 280/688, 689, 690, 701, 112 A, 112.1, 112.2

[56] References Cited

U.S. PATENT DOCUMENTS

| | | | |
|---|---|---|---|
| 4,326,734 | 4/1982 | Kroniger | 280/724 |
| 4,466,636 | 8/1984 | Cornacchia et al. | 280/724 |
| 4,550,926 | 11/1985 | MacIsaac | 280/772 |

*Primary Examiner*—Richard A. Bertsch
*Attorney, Agent, or Firm*—Baker, Maxham, Jester & Meador

[57] ABSTRACT

An automobile suspension system has linkage and geometry for compensating for roll and dip of the chassis during cornering for maintaining a zero camber of the vehicle wheels during roll of the vehicle chassis.

17 Claims, 2 Drawing Sheets

CONSTANT CAMBER SUSPENSION SYSTEM

BACKGROUND OF THE INVENTION

The present invention relates to automobile suspensions and pertains particularly to a suspension system having geometry and linkages for maintaining constant camber.

Vehicle suspension systems include various combinations of springs (coil, leaf, air or torsion bar), axle housing, torque arms, A-frames, anti-roll bars, stabilizers, shock absorbers., and so forth. These components have been assembled in various combinations in an effort to produce the desired ride, handling and performance characteristics of the vehicle.

In a typical suspension system, the vehicle chassis or body is supported on the wheels in a manner to enable the wheels to rise and fall independent of the chassis to accommodate uneven road conditions. The changes in the spacing between wheels, axles and the body/chassis due to turning, uneven road and other similar conditions are accommodated by arms, linkages, struts, and are cushioned by springs. System oscillations are limited by dampers which are usually called shock absorbers.

The ride and performance or handling of the vehicle is affected by many factors related to the suspension system. The suspension system must accommodate, yet resist tendency of the vehicle to pitch when traversing bumps and dips, and to resist roll when turning. A given suspension system will perform best when properly aligned and tuned.

There is a continuing effort to improve the economy, performance, road handling, and reliability of automobiles. A good suspension system will provide improved performance and road handling, and in most instances will result in improved economy and reliability. One of the factors that affects road handling and performance is tire grip or adhesion of the tires to the road surface. An important factor that affects tire grip is camber, which is the angle the tire makes with the vertical. Positive angle tilts the top of the wheel out, and negative camber tilts the top of the wheel in.

Most modern tires have a wide flat tread surface. It is important to keep the wide surface flat on the road surface for optimum traction and performance and to reduce wear. Camber angle is critical to tire traction and to vehicle handling and performance. The camber angle is controlled by the suspension linkage and its geometry. It is desirable to keep the camber angle zero or near zero at all times to optimize road handling and performance.

Conventional .suspension systems tend to be a compromise between cost and performance. They tend to sacrifice performance and road handling for economy.

It is, therefore, desirable to provide an improved suspension system capable of maintaining optimum camber.

SUMMARY AND OBJECTS OF THE INVENTION

It is the primary object of the present invention to provide an improved automobile suspension system.

In accordance with the primary aspect of the present invention, a suspension system for an automobile comprises upper and lower control members pivotally mounted to a wheel assembly and a vehicle chassis, with one of the upper and lower control members being connected to the chassis by means of a moveable pivot that enables shifting of the control member for compensating for chassis roll for maintaining zero camber of the vehicle wheels.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
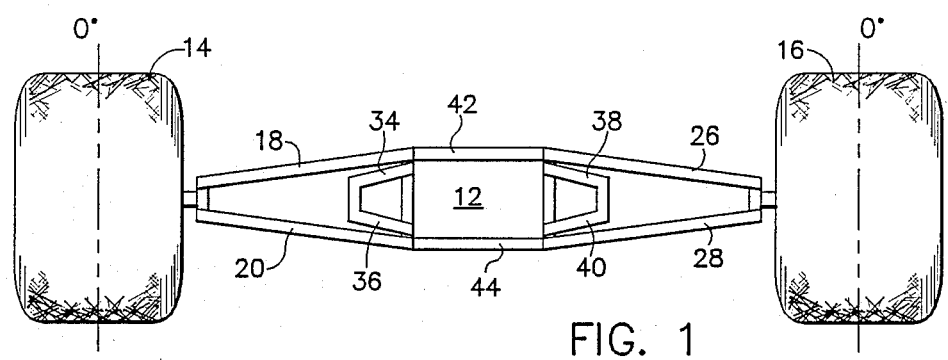
FIG. 1 is a top elevation view of a suspension system embodying a preferred embodiment of the invention.
Figure 2:
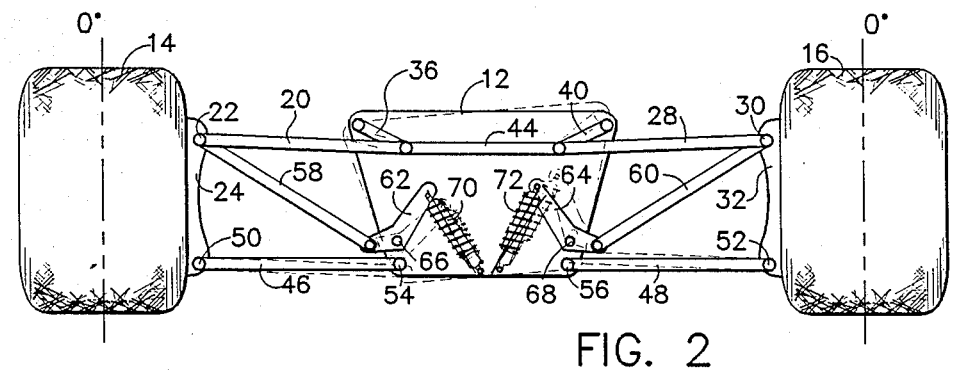
FIG. 2 is a .front elevation view showing the linkage of FIG. 1 in a straight ahead or rest position.

Referring to FIGS. 1 and 2 of the drawings, there is illustrated top and front elevation views, respectively, of a vehicle suspension system, designated generally by the numeral 10, embodying a preferred embodiment of the invention. As illustrated, there is disclosed a vehicle chassis or body 12, which is supported on a pair of wheels 14 and 16 by means of a suspension system. The suspension may be for either front or rear, or both, and details of drive and steering are not illustrated herein. The illustrated and described systems herein will be described as the front end of the vehicle coming toward the reader/viewer. The system, as illustrated, comprises a double wishbone type wherein both upper control members have a somewhat A or wishbone configuration, with a pair of control arms extending from a common body member at one end. This type suspension system is commonly used on racing cars. Each of the upper arms are connected to the uppermost end or portion of the respective wheel and axle assembly 24, 32. The upper arms are connected at their inner ends to moveable pivots such as pairs of swing or float links 34, 36 and 38, 40, one pair on each side of the vehicle chassis, and are further connected together at the floating ends thereof by a pair of connecting links 42 and 44.

A pair of lower control arms 46 and 48 are substantially like the upper arms and are pivotally connected at the outer ends thereof by pins 50 and 52 to the lowermost position of the wheel axle assemblies 24, 32. These arms 46 and 48 are pivotally connected at their inner ends directly to pivot pins 54 and 56 directly to the chassis. The upper arms and lower arms can be of the same length or slightly different in length, but form a bar linkage with the wheel assembly. The swing or float links enable the upper arms to extend and retract in order to maintain the wheels vertical (zero camber) during cornering. However, one can maintain zero degrees camber over a one wheel bump only if upper and lower arms are parallel and of the same length.

A pair of diagonal links or pull rods 58 and 60 are connected at an outer end to the uppermost portion of the axle assemblies 24, 32, and at the inner end to an outer end of a lever 62 and 64, that's pivotally connected or mounted to the chassis at 66 and 68, with an inner end that is connected to a damper and spring assembly 70 and 72. These links and springs support the vehicle chassis between the wheels. Other geometric arrangements for the spring support of the chassis may also be used but are not illustrated.

This linkage construction and geometry is such that the camber of the wheels, which are preferably set at zero camber, will maintain that zero camber throughout a turn of the vehicle and roll of the chassis. In other words, the wheels will maintain a constant camber (i.e. vertical position) throughout the turn while permitting the chassis to roll a small amount about its longitudinal roll axis.

As shown in phantom in FIG. 2, when the vehicle enters a turn to the left for example (the viewer's right), the chassis will pivot or roll about a roll center or axis thereof, such that the upper control arm links 20, 28 will move relative to their initial position and relative to the chassis to pull the upper portion of the right wheel (viewer's left) inward, and push the upper portion of the other or left wheel (viewer's right) outward through the action of the floating links 36 and 40 at the upper portion of the chassis. Thus, the tilt or roll of the chassis will be accommodated by the floating inner ends of the control arms.

The floating control members 20, 28 are used to enable the chassis 12 to roll or pivot, yet maintain a zero camber of the wheels 14 and 16. It should be noted that the float links 36 and 40 are illustrated as being considerably shorter in length than the control arms 20 and 28 and are angled inwardly toward the chassis roll axis. However, the float links can be substantially any length so long as the angle between them and the control arms are proper.

Figure 3:
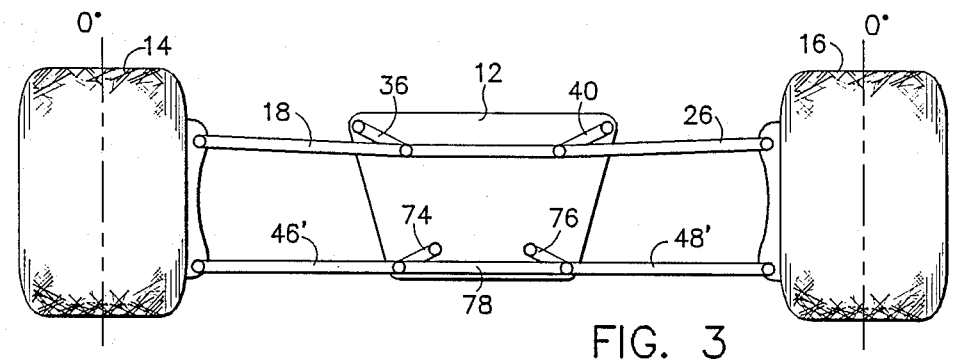
FIG. 3 is a front elevation view like FIG. 2 of an alternate embodiment in the straight ahead position.

Referring now to FIG. 3 wherein the same or identical member are represented by the same numeral and equivalent members by the same number primed, it is seen that the upper A arms of the linkage system are identical to the prior embodiment, with the lower control arms being pivoted or floating to pivoting links at the inner end. In this embodiment, the inner ends of the respective lower control arms 46' and 48' are connected to pairs of float or swing links, only one of each pair 74 and 76 shown on each side of the vehicle chassis 12. These float links are pivotally directly to the chassis with a connecting link 78 extending between the outer ends thereof and the inner ends of the lower control arms 46' and 48'.

It is seen from the geometry of this linkage that the upper float links 36 and 40 are angled from their connection or pivoting to the chassis inward toward the roll center or roll axis of the vehicle chassis. The lower float or pivoting links 74 and 76 angle from their pivoting connection to the chassis outwardly from the center of the chassis. It is also noted that the lower links are shorter in length than the upper ones. The lower links are in the order of about one-half the length of the upper links. Both the upper and lower links extend at an angle of around sixty degrees to the vertical. The angles and length of the respective float links must be sufficient to accommodate the roll of the chassis and maintain the wheels at the predetermined camber. The length and angle of the lower links 74 and 76 are more critical to the result than that of the upper links. Based on studies to date, it appears that the lower links can be of only one length and angle for any given system.

With the linkage shown in FIG. 3, the chassis will roll about a center of roll between the top and bottom thereof, with the chassis 12 tilting and the control arms and the swing or float links moving such that the wheels maintain a vertical or zero camber position. Link 36 will align and move with arm 18, pulling the top of the wheel 14 in, while link 74 will align with arm 46' pushing the bottom out.

Figure 4:
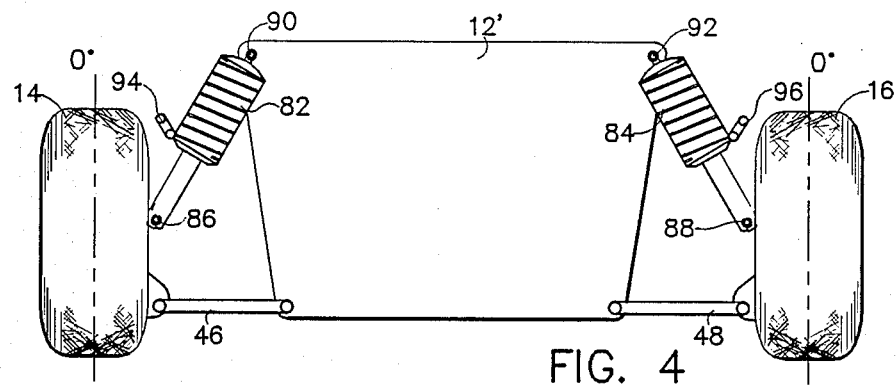
FIG. 4 is a front elevation view like FIG. 2 of another embodiment in the straight ahead position.

Referring now to FIG. 4 of the drawing, there is illustrated a modification in a suspension system of the type commonly used on passenger cars. The lower part of the suspension system is identical to that of FIG. 1, with control arms 46 and 48 pivotally connected directly to the chassis 12. A pair of MacPherson struts 82 and 84 are used in place of the upper wishbones or A arms of the system. In this embodiment, the lower A arms are pivotally connected as in previous embodiments at the outer end directly to the wheel axle assembly, and at the inner end directly to the chassis of the vehicle.

The axle assembly is supported at the upper end thereof by a pair of MacPherson struts 82 and 84, which are pivotally connected at their lower ends by pins or the like 86 and 88 to the upper end of the respective axle assembly 24 and 32 and are pivotally connected at the upper end thereof at pins 92 to the chassis 12'. The lower end of the shock or strut housing is pivotally connected by a swing link 94 and 96 to the vehicle chassis. This connection and geometry enables the vehicle chassis to roll, as in FIG. 2, and the rolling movement of the chassis straightens link 96, forcing the upper or top of the right wheel outward. The upper portion of the left wheel is pulled inward such that the wheels maintain a substantially zero camber as the vehicle chassis rolls in a turn or the like.

Figure 5:
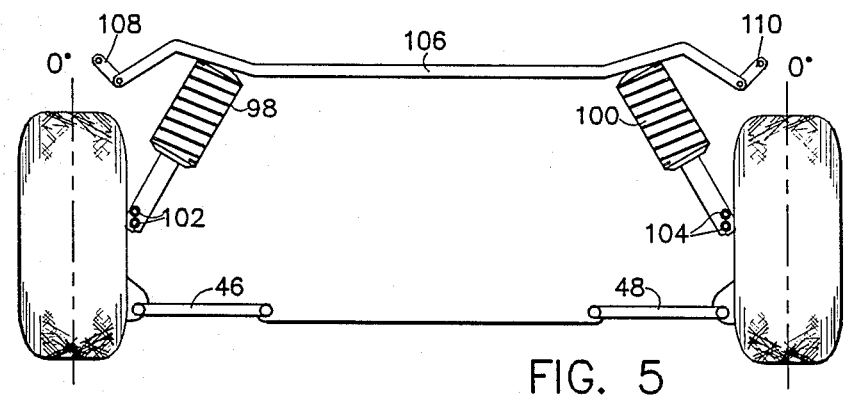
FIG. 5 is a front elevation view of a further embodiment.

Referring now to FIG. 5, there is illustrated an embodiment wherein the lower control arms are identical to that of the previous embodiment, and shown in FIG. 4. However, upper control members are a pair of MacPherson struts which are mounted by means of a different linkage system. In this embodiment, the lower ends of the strut members 98 and 100 are fixed at 102 and 104 to the upper end of the axle assemblies so that they do not pivot relative thereto. The upper ends of the struts 98 and 100 are fixed at the upper ends thereof to an elongated link 106 that extends transverse to the vehicle chassis, and is connected to the chassis by means of swing links 108 and 110 at each end thereof to the respective sides of the vehicle chassis. The linkage and its geometry are such that, as in the prior embodiment, as the vehicle body or chassis 12' rolls as a result of a turn or the like, the linkage is such that the top of the right tire (as viewed herein) is forced to the right away from the chassis, and the top of the left tire is similarly forced to the right toward the chassis, maintaining the wheels in their substantially vertical or zero camber positions.

Figure 6:
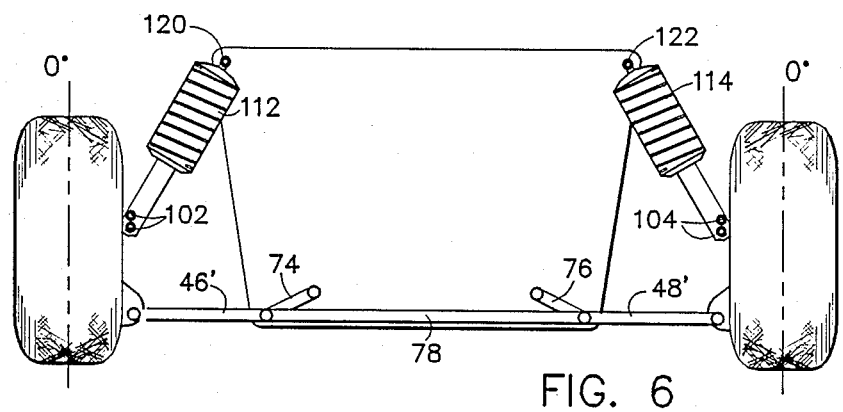
FIG. 6 is a front elevation view of still another embodiment.

Referring now to FIG. 6 of the drawing, there is illustrated a still further embodiment wherein the linkage construction and geometry is such that the wheels will maintain a substantially zero camber. In this embodiment, the lower A arms 46' and 48' are connected as in the previous FIG. 3 embodiment to a pair of swing links 74 and 76 at their inner ends, with a connecting link 78 connected between the ends. Thus, the inner ends of the lower control arms float on the outer or free ends of the float links 74 and 76, as in certain previous embodiments.

The upper end of the axle assemblies are controlled by a pair of MacPherson struts 112 and 114, which are fixed at their lower ends at 116 and 118 to the upper portion of the respective wheel assembly and are pivoted at their upper ends at 120 and 122 to the vehicle chassis. The MacPherson struts therefore maintain their same relative position or angle relative to the wheel or axle assemblies. The vehicle chassis when rolling, as shown in phantom, depresses one strut 112 and at the same time extends the other strut 114, while at the same time enabling the lower arm of the right hand wheel (as viewed by the observer) to move inward and forcing the lower end of the left hand wheel to move outward relative to the chassis, such that the wheels again maintain a substantially zero camber.

These embodiments, as will be appreciated, have a number of common features, namely that either the upper or lower or both of the control arms or members are permitted to float at the inner end relative to the vehicle chassis. The linkage and its geometry is such that forces tending to cause a rolling of the chassis is transferred and moves the upper or lower portion of the wheel assembly relative to the chassis in a manner to maintain the respective wheel assembly substantially at vertical or zero camber.

I have found that in the double wishbone system (FIGS. 1-3), I can maintain a zero camber for cornering and for one wheel bump conditions. In the combination MacPherson strut systems (FIGS. 4-6), I can maintain the wheels substantially at zero camber during cornering and one wheel bump conditions. This is to say that there will be a slight variation in camber from zero up to as much as two and one-half degrees in some cases for the strut embodiment.

While the principal of the present invention has been illustrated by means of a number of specific embodiments, it is to be understood that numerous changes and modifications may be made therein without departing from the spirit and scope of the invention as defined in the appended claims.

I claim:

1. A vehicle suspension system comprising:
  a lower control arm for connecting a wheel assembly to one side of the chassis of a vehicle;
  an upper control member for connecting an upper portion of said wheel assembly to said vehicle chassis;
  a float link connecting one of said upper control member and lower control arm to said chassis for maintaining a wheel of said wheel assembly at a substantially constant camber in response to movement about the roll axis of said chassis; and
  a tie link connecting the inner end of one of said upper member and said lower control arm to a respective opposite like control member and control arm.

2. A vehicle suspension system according to claim 1 wherein:
  said upper control member is a control arm.

3. A vehicle suspension system assembly according to claim 2 wherein:
  the inner end of said upper control arm is connected by a float link to said chassis.

4. A vehicle suspension system according to claim 2 wherein:
  the inner end of both said upper and said lower control arms are connected by a float link to said chassis.

5. A vehicle suspension system comprising:
  a lower control arm for connecting a wheel assembly to one side of the chassis of a vehicle;
  an upper control arm for connecting an upper portion of said when assembly to said vehicle chassis; and
  a float link connecting one of said upper control member and lower control are to said chassis for maintaining a wheel of said wheel assembly at a substantially constant camber in response to movement about the roll axis of said chassis;
  the inner end of both said upper and said lower control arms are connected by a float link to said chassis; and
  a tie link connecting the inner end of both of said upper and said lower control arms to an opposite like control arm.

6. A vehicle suspension system comprising:
  a lower control arm for connecting a wheel assembly to one side of the chassis of a vehicle;
  an upper control member for connecting an upper portion of said wheel assembly to said vehicle chassis; and
  a float link connecting one of said upper control member and lower control arm to said chassis for maintaining a wheel of said wheel assembly at a substantially constant camber in response to movement about the roll axis of said chassis, said float link is less than one half the length of the control arm and has one end pivotally connected to the vehicle chassis and a free end connecting the inner end of the control arm to the chassis, said free end normally extending generally toward the roll axis of the chassis.

7. A vehicle suspension system comprising:
  a lower control arm for connecting a wheel assembly to one side of the chassis of a vehicle;
  an upper control member for connecting an upper portion of said wheel assembly to said vehicle chassis; and
  a float link connecting one of said upper control member and lower control arm to said chassis for maintaining a wheel of said wheel assembly at a substantially constant camber in response to movement about the roll axis of said chassis, wherein said upper control member is a MacPherson strut.

8. A vehicle suspension system according to claim 7 wherein:
  said strut pivotally connected by said float link to said chassis.

9. A vehicle suspension systems according to claim 7 wherein:
  said lower control arm connected by said float link to said chassis.

10. A vehicle suspension system comprising:
  right and left suspension assemblies for mounting right and left wheel assemblies to a vehicle chassis;
  said suspension assemblies each comprising an upper control arm and a lower control arm, each having an outer end for connecting to a wheel assembly and an inner end for connecting to a chassis; and
  a float link having an inner end pivotally connected to said chassis and a free outer end connecting one of said upper and lower control arms to said chassis for enabling said control arm to extend and retract for maintaining a wheel assembly at a substantially constant camber in response to movement about the roll axis of said chassis; and
  said float link is less than one half the length of the control arm and has one end pivotally connected to the vehicle chassis and a free end connecting the inner end of the control arm to the chassis, said free end normally extending generally toward the roll axis of the chassis.

11. A vehicle suspension system assembly according to claim 10 wherein:
the inner end of said upper control arm is connected by said float link to said chassis.

12. A vehicle suspension system according to claim 10 wherein:
the inner end of both said upper and said lower control arms are connected by a float link to said chassis.

13. A vehicle suspension system comprising:
right and left suspension assemblies for mounting right and left wheel assemblies to a vehicle chassis;
said suspension assemblies each comprising an upper control member and a lower control member, each having an outer end for connecting to a wheel assembly and an inner end for connecting to a chassis; and
a float link having an inner end pivotally connected to said chassis and a free outer end connecting one of said upper and lower control members to said chassis for enabling said control member to extend and retract for maintaining a wheel assembly at a substantially constant camber in response to movement about the roll axis of said chassis, wherein said upper control member is a MacPherson strut.

14. A vehicle suspension system according to claim 13 wherein:
said strut is pivotally connected by said float link to said chassis.

15. A vehicle suspension system according to claim 13 wherein:
said lower control arm connected by said float link to said chassis.

16. A vehicle suspension system for maintaining zero degree camber comprising:
right and left suspension assemblies for mounting right and left wheel assemblies to a vehicle chassis;
said suspension assemblies each comprising an upper control member and a lower control member, each having an outer end for connecting to a wheel assembly and an inner end for connecting to a chassis; and
a float link having an inner end pivotally connected to said chassis and a free outer end connecting one of said upper and lower control members to said chassis for enabling said control member to extend and retract for maintaining a wheel assembly at a constant camber in response to tilt of said chassis, said free end normally extending at an angle between about thirty and sixty degrees to the vertical and generally toward the roll axis of the chassis, said float link having a length that is less than one-half the length of the control arm; and
a tie link extending between and connecting the free outer end of opposite pairs of said float links.

17. A vehicle suspension system assembly according to claim 16 wherein:
the inner end of said upper control member is connected by said float link to said chassis.

* * * * *